United States Patent [19]

Takeuchi et al.

[11] 4,433,614
[45] Feb. 28, 1984

[54] VACUUM BOOSTER DEVICE

[75] Inventors: Hiroo Takeuchi, Asashina; Nobuaki Hachiro; Yoshihisa Miyazaki, both of Ueda, all of Japan

[73] Assignee: Nissin Kogyo Kabushiki Kaisha, Nagano, Japan

[21] Appl. No.: 269,985

[22] Filed: Jun. 3, 1981

[30] Foreign Application Priority Data

Sep. 18, 1980 [JP] Japan ................. 55-129633

[51] Int. Cl.³ .............................. F15B 9/10
[52] U.S. Cl. .................... 91/376 R; 60/547.1; 92/165 PR; 92/166
[58] Field of Search ...... 60/547 R; 92/98 D, 165 PR, 92/166; 91/369 A, 376 R

[56] References Cited

U.S. PATENT DOCUMENTS

| 4,256,016 | 3/1981 | Thomas | 91/369 A |
| 4,270,353 | 6/1981 | Thomas | 60/581 |
| 4,325,218 | 4/1982 | Weiler | 60/547 R |
| 4,328,738 | 5/1982 | Hamamatsu | 92/99 |
| 4,330,996 | 5/1982 | Becht | 91/376 R |
| 4,334,459 | 6/1982 | Riedel | 92/166 |
| 4,339,921 | 7/1982 | Schanz | 60/547 R |

FOREIGN PATENT DOCUMENTS

| 9393 | 4/1980 | European Pat. Off. | 92/98 D |
| 2009871 | 6/1979 | United Kingdom | 60/547 R |
| 2031086 | 4/1980 | United Kingdom | 91/369 A |
| 2053395 | 2/1981 | United Kingdom | 91/369 A |
| 2068067 | 8/1981 | United Kingdom | 92/166 |

*Primary Examiner*—Abraham Hershkovitz
*Attorney, Agent, or Firm*—Armstrong, Nikaido, Marmelstein & Kubovcik

[57] ABSTRACT

A highly durable and light-weighted vacuum type brake booster device including a booster shell, a booster piston axially slidably accommodated in the booster shell to divide the interior thereof into a first chamber communicating with a vacuum source and a second chamber adapted to be placed into selective communication through a control valve with the first chamber and the atmosphere, and an input rod operatively connected with the control valve for operating the latter to generate a pressure differential between the first and second chambers. The front and rear walls of the booster shell are connected with each other by means of tie rod(s) which extend(s) through the booster piston with a deformable seal member disposed therebetween. The booster piston is urged in a retracting direction by a return spring disposed in the first chamber. A retainer plate for supporting one end of the return spring abuts against the front wall of the booster shell to prevent the vacuum deformation thereof and is secured to the tie rod so that the resilient force of the spring is shared by the tie rod to avoid any excessive loading on the booster shell.

1 Claim, 2 Drawing Figures

VACUUM BOOSTER DEVICE

BACKGROUND OF THE INVENTION

This invention relates to vacuum booster devices for boosting automotive brake master cylinder by vacuum pressure and, more particularly, to improvements in those of the type comprising a booster shell, a booster piston axially slidably accommodated in the booster shell, first and second working chambers defined in the booster shell separately from each other by the booster piston, the first working chamber being held in communication with a vacuum source, the second working chamber being selectively placed in communication with the first working chamber or the atmosphere through a control valve means, an input rod mounted on the booster piston for forward and rearward movement with respect to the latter and connected to the control valve means so as to produce a pressure difference between both the working chambers for causing the booster piston to follow the forward movement of the input rod, tie rod means extending through the booster piston for connection of front and rear walls of the booster shell, seal means arranged between the tie rod means and the booster piston allowing operation of the piston, and a return spring compressed in the first working chamber for reinforcing the retraction of the booster piston.

In the above-mentioned booster device, the booster shell can be protected from effect of the forward thrust loaded from output side by transmitting the thrust to the vehicle body through the tie rods so that such high rigidity as to bear the thrust loading need not be given to the booster shell, and advantageously, the shell can be formed light-weighted by using thin steel sheets, synthetic resins or the like as its base materials.

However, in this known device, if the weight of the booster shell is lessened to an excessive degree, the booster shell may be outwardly deformed by the resilient force of the return spring of the booster piston in case of an unsupported booster device, central portion of the front wall of the booster shell defining the first working chamber may be inwardly deformed under the sucking action of the vacuum pressure when the pressure is accumulated in the first working chamber.

SUMMARY OF THE INVENTION

The present invention aims at overcoming the difficulties encountered in the prior art as described above and has for its primary object the provision of a new and improved vacuum booster device of the type described wherein the tie rods are arranged so as not to rotate and connection of the tie rods, master cylinder and vehicle body is readily carried out by means of nuts and bolts provided at both ends of the tie rods.

The above and other objects, features and advantages of the present invention will become apparent from the following description when taken in conjunction with the accompanying drawings, which illustrate a presently preferred embodiment of the invention.

DESCRIPTION OF THE PREFERRED EMBODIMENT

Figure 1:
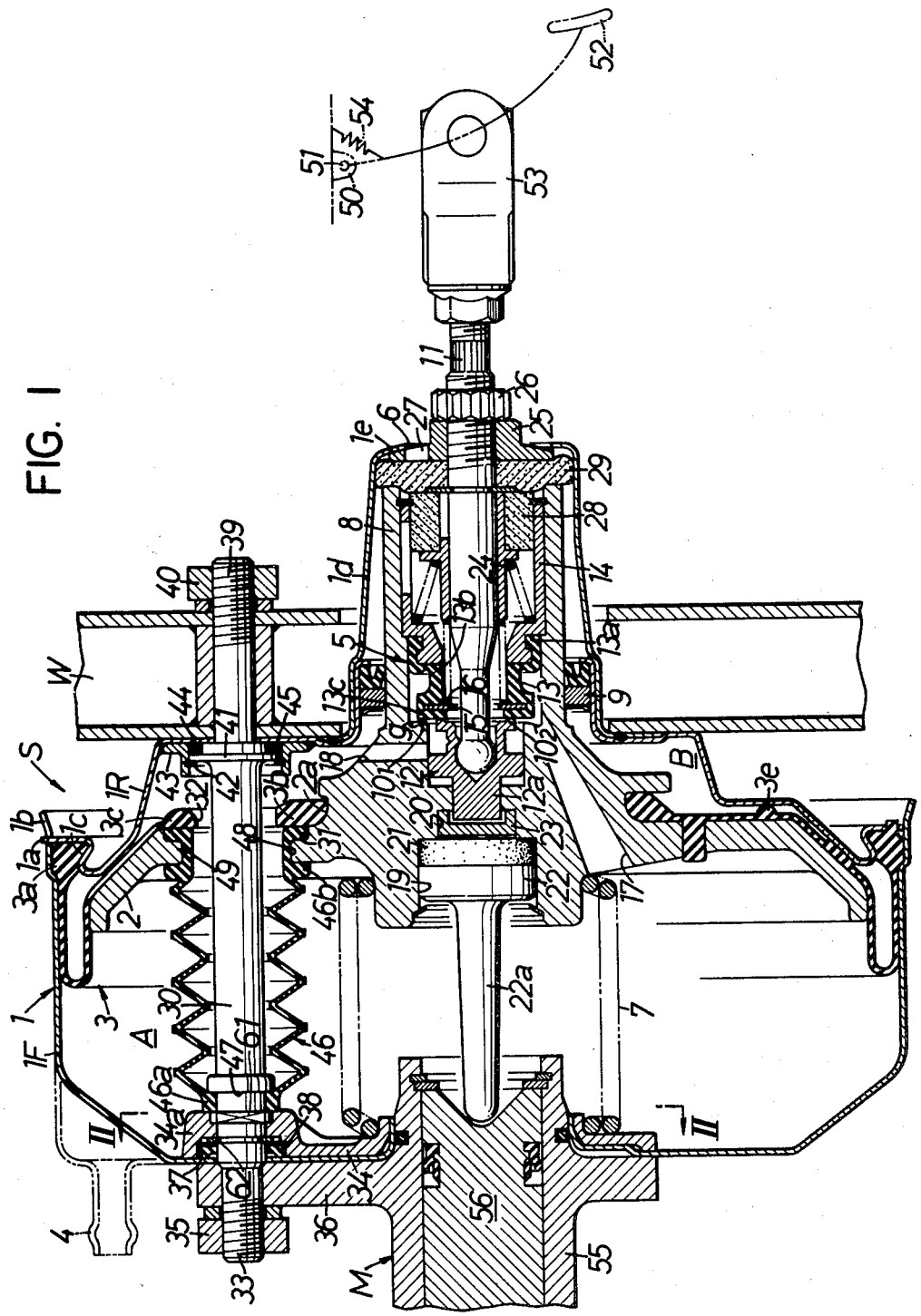
FIG. 1 is a longitudinal cross-sectional view in side elevation of a preferred embodiment of a vacuum booster device in accordance with the present invention.

A preferred embodiment of the present invention will be explained hereinafter with reference to the drawings. In FIG. 1, a vacuum booster device, generally denoted by S, has a booster shell 1 which is composed of a pair of front and rear bowl-like parts 1F and 1R made of light thin steel plate or synthetic resin. The rear bowl-like part 1R has a plurality of projections 1a formed around an opening of the rear bowl-like part 1F at equal circumferential intervals. The projections 1a are fitted to a plurality of notches 1b formed around an opening of the front bowl-like part 1F at equal circumferential intervals so as to position both the bowl-like parts 1F and 1R in place. The parts 1F and 1R are connected together at their opposing front and rear walls through tie rods 30.

Figure 2:
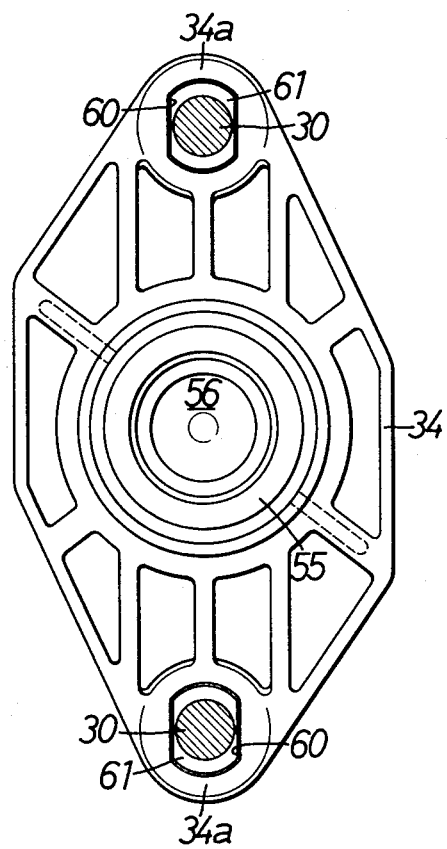
FIG. 2 is a cross sectional view taken along the line II—II in FIG. 1.

At least two pieces of the tie rods 30 are disposed in a symmetrical arrangement about the axis of the booster shell 1 (See FIG. 2). The connection between the booster shell 1 and tie rods 30 will be described later.

The interior space of the booster shell 1 is divided into a front side first working chamber A and a rear side second working chamber B by booster piston 2 axially slidably accommodated in the booster shell 1 and a piston diaphragm 3 formed of flexible material such as rubber or the like and joined to the rear face of the booster piston 2. The piston diaphragm 3 is of annular shape as a whole, and has annular beads 3a and 3b integrally formed, respectively, with outer and inner peripheral edges of the diaphragm 3 and respectively fitted in annular grooves 1c and 2a which are formed in a joining portion of both of the bowl-like parts 1F and 1R and in a rear face of the booster piston 2, respectively.

The first working chamber A is always held in communication with a vacuum source, namely the interior of an intake manifold, not shown, of an associated internal combustion engine through a vacuum inlet pipe 4, while the second working chamber B is selectively placed in communication with the first working chamber A or in an air inlet port 6 open to the end wall 1e of a rearward extention tube 1d of the booster shell 1 through a control valve 5 which will be described later.

The booster piston 2 is normally biased rearward, i.e., toward the second working chamber B by a return spring 7 arranged under compression in the first working chamber A. The rearward travel of the booster piston 2 under the spring bias is limited by projections 3e formed on the rear face of the piston diaphragm 3 being in abutting engagement with the inside surface of the rear wall of the booster shell 1. The fixed end of the return spring 7 is supported by a spring retainer plate 34 installed in abutment against the inside surface of the front wall of the booster shell 1.

The booster piston 2 and the piston diaphragm 3 are respectively provided with through holes 31 and 32 for passing the tie rods 30 therethrough. The through hole 32 is open to the front face of the piston diaphragm 3 separable from the booster piston 2, and an annular bead 3c is integrally formed around a peripheral edge of the through hole 32.

A tubular valve spring 8 axially extending from a central portion of the rear face of the booster piston 2 and integrally formed therewith is slidably supported by a plain bearing 9 provided in the extension tube 1d and the rear end of which is open to the air inlet port 6.

The control valve 5 is constructed inside the tubular valve casing 8 in such a manner that an annular first valve seat $10_1$ is formed on the front inside wall of the tubular valve casing 8, a valve piston 12 connected to an input rod 11 to form the front end of the latter is slidably fitted in the front part of the tubular valve casing 8, and an annular second valve seat $10_2$ encircled by the first valve seat $10_1$ is formed at the rear end of the valve piston 12.

A cylindrical valve element 13 with its both ends opened is held at its base end portion 13a between the inside wall of the valve casing 8 and the outer periphery of a valve retainer sleeve 14 fitted inside the valve casing 8. The valve element 13 is formed of elastic material such as rubber or the like, and has a thin diaphragm 13b extending radially inwardly from the base end portion 13a, and a thick valve portion 13c formed at the inner peripheral end of the diaphragm 13b and opposed to the first and second valve seats $10_1$ and $10_2$. The valve portion 13c is axially movable owing to the deformation of the diaphragm 13b and capable of abutting against the front end surface of the valve retainer sleeve 14.

An annular reinforcing plate 15 is embedded in the valve portion 13c and is worked by a valve spring 16 for assisting the valve portion 13c in movement toward both the valve seat $10_1$ and $10_2$.

A space radially outside of the first valve seat $10_1$, a middle space between both the first and second valve seats $10_1$ and $10_2$, and a space radially inside of the second valve seat $10_2$ are always in communication with the first working chamber A through a through hole 17 formed in the booster piston 2, the second working chamber B through another through hole 18 in the piston 2 and the air inlet port 6 through the interior of the valve element 13, respectively.

A large hole 19 is opened in a central portion of the front face of the booster piston 2 and a small hole 20 is opened at the recessed end of the large hole 19. An elastic piston 21 made of rubber or the like and an output piston 22 of the same diameter with the former are slidably fitted in the large hole 19 in the mentioned order from the recessed end thereof while a reaction piston 23 of a diameter smaller than that of the elastic piston 21 is slidably fitted in the small hole 20. A small shaft 12a projected from the front end surface of the valve piston 12 is protruded into the small hole 20 and opposed to the rear end surface of the reaction piston 23. The output piston 22 is integrally formed with a forwardly projecting output rod 22a.

The input rod 11 is normally biased rearward by a return spring 24 and the rearward travel thereof is limited by a movable stopper plate 25 screw-fitted to the input rod 11 being in abutting engagement with the inside of the end wall 1e of the rearward extension tube 1d. Axial location of the input rod 11 with respect to the screw-fitted movable stopper plate 25 is changed by turning the latter and accordingly the retracting limit of the input rod 11 can be adjusted in both forward and rearward directions. The movable stopper plate 25 after being thus adjusted in position is fixed by fastening a lock nut 26 also screw-fitted to the input rod 11. The movable stopper plate 25 is provided with an air vent 27 for preventing the blocking of the air inlet port 6.

Air filter elements 28 and 29 are fitted in the outer end opening of the tubular valve casing 8 for purifying the air induced through the air inlet port 6 and are transformable so as not to hinder the operation of the input rod 11.

The mechanism for connection of the tie rods 30 and the booster shell 1 will be described hereinafter.

The spring retainer plate 34 is kept from turning by fitting the two tie rods 30 in both the front and rear walls of the booster shell 1 together with the aid of a pair of bosses 34a integrally projected at both the ends of the spring retainer plate 34. An intercepted round concave hole 60 is provided in each of the inner ends of the bosses 34a and an intercepted round flange 61 disposed on each tie rod 30 is fitted in the concave hole 60 so that the tie rod is kept from turning. Further, each of the outer ends of the bosses 34a is provided with a concaved seal housing 37 wherein the tie rod 30 is fitted with a retaining ring 62 for holding the boss 34a by cooperating with the flange 61. The seal housing 37 is filled with a sealing material 38 to be used for sealing the tie rod through hole opened in the front wall of the booster shell 1. In this way, the spring retainer plate 34 is connected with the tie rods 30, so that the resilient force of the return spring 7 is loaded on the tie rods 30 and the central portion of the front wall of the booster shell 1 is kept from being inwardly deformed.

On the other hand, a stepped flange 41 on each of the tie rods 30 is fitted in each of support cylinders 43 welded to the inside surface of the rear wall of the booster shell 1. The support cylinder 43 is inserted therein each tie rod 30 and is fitted with the retaining ring 62 for holding the stepped flange 41 by cooperating with the rear wall of the booster shell 1. An annular housing 44 defined between a smaller diameter portion of the stepped flange 41 and the support cylinder 43 is filled with a sealing material 45 to be used for sealing the tie rod through hole in the rear wall of the booster shell 1.

Both the ends of the tie rod 30 projected outwardly from the front and rear sides of the booster shell 1 are respectively formed as mounting bolts 33 and 39. The tie rod 30, spring retainer plate 34, front wall of the booster shell 1 and a mounting flange 36 of the brake master cylinder M are connected together by tightly screwing the nut 35 on the tip end of the front mounting bolt 33 extended through the mounting flange 36 overlaid on the front surface of the booster shell 1, while the tie rod 30, rear wall of the booster shell 1 and front wall W of the compartment are connected together by tightly screwing the nut 40 on the tip end of the rear mounting bolt 39 extended through the front wall W of the automobile compartment. As mentioned above, the tie rod 30 is kept from turning by fitting engagement of the intercepted round concave hole 60 of the spring retainer plate 34 with the intercepted round flange 61 and the spring retainer plate 34 is also kept from turning by means of the two tie rods so that in tightening the nuts 35 and 40, the nuts 35, 40 and the tie rod 30 are prevented from being turned together to assure a secure tightening of the nuts 35 and 40.

A sealing means is arranged between the booster piston 2 and the tie rod 30 for sealing the through hole 31 of the booster piston 2 with the tie rod 30 inserted therein in such a manner as not to hinder the operation of the booster piston 2. The sealing means comprises a flexible bellows 46 made of elastic material such as rubber or the like. The bellows 46 surrounds the tie rod 30 inside the front working chamber A, and the front and rear ends 46a and 46b of the bellows 46 are tightly fixed to an annular groove 47 located at the outer periphery of the front end of the tie rod 30 and to the through hole 31 in the booster piston 2, respectively. Further, the through hole 32 is sealed with the bellows 46 by closely but separably mating the rear end 46b of the bellows 46 and the front surface of the annular bead 3c of the piston diaphragm 3.

Inside the compartment, a brake pedal 52 pivoted at 51 on a fixed bracket 50 is connected to the rear end of the input rod 11 of the booster device S through an adjustable pedal link 53. Reference number 54 indicates a return spring for rearwardly biasing the brake pedal 52.

Rear end of a cylinder body 55 of the brake master cylinder M is extended through the front wall of the booster shell 1 and protruded into the first working chamber A while rear end of a working piston 56 inside the cylinder body 55 is opposed to the output rod 22a of the booster device S.

Description will next be made of the operation of the embodiment described above.

The drawings show the state of the booster device not in operation, wherein the valve piston 12, the input rod 11 and the brake pedal 52 linked with one another are returned to the prescribed retractive position where the movable stopper plate 25 is abutted against the fixed end wall 1d and held in the position under the resilient force of the return spring 24. Front face of the valve portion 13c is pushed by the valve piston 12 through the second valve seat $10_2$ and is retracted until it is slightly touched on the front face of the valve retainer sleeve 14, whereby a little clearance g is made between the first valve seat $10_1$ and the valve portion 13c. Such state can easily be obtained by adjusting the aforesaid movable stopper plate 25.

Consequently, during running of the engine, the first working chamber A always accumulating vacuum pressure therein is placed into communication with the second working chamber B through the through hole 17, clearance g and through hole 18, and the front opening of the valve portion 13c is closed by the second valve seat $10_2$, so that the vacuum pressure in the first working chamber A is transmitted to the second working chamber B to obtain equilibrium of the pressures in both the working chambers A and B. The booster piston 2 is therefore located in the retracted position as shown in FIG. 1 by the resilient force of the return spring 7.

In the brake operation, when the brake pedal 52 is depressed and the input rod 11 and the valve piston 12 are advanced, the valve portion 13c forwardly biased by a valve spring 16 follows the advancement of the valve piston 12 to also move forwardly. However, since the clearance g between the first valve seat $10_1$ and the valve portion 13c is very narrow as referred to above, the valve piston 13c is immediately seated on the first valve seat $10_1$ to close the communication between both the working chambers A and B and at the same time the second valve seat $10_2$ is separated from the valve portion 13c to connect the second working chamber B with the air inlet port 6 through the through hole 18 and interior of the valve element 13. Thus, the ambient air is induced into the second working chamber B without delay and the pressure in the chamber B becomes higher than that in the first working chamber A, whereby, owing to the pressure difference between both the chambers A and B, the booster piston 2 is moved forwardly against the return spring 7 to advance the output rod 22a through the medium of the elastic piston 21 so that a working piston 56 of the brake master cylinder M is forwardly driven to brake the vehicle. On this occasion, the rear end 46c of the bellows 46 is forcibly contacted with the annular bead 3c on the piston diaphragm 3 by the pressure difference between both the working chambers A and B, so that the communication between both the working chambers A and B are securely cut off.

When the working piston 56 is driven, the forward thrust load is applied to the cylinder body 55 as described above and is then transmitted to the vehicle body through the tie rod 30, that is, the front wall W of the compartment and supported by the wall W. The load is, therefore, not applied to the booster shell 1.

On the other hand, when a small shaft 12a of the valve piston 12 is advanced to abut against the elastic piston 21 through the reaction piston 23, the reaction force of the output rod 22a is partly fed back to the side of the brake pedal 52 through the valve piston 12 owing to the expansion of the elastic piston 21 toward the side of the reaction piston 23 caused by the reaction force of the output rod 22a, so that the output of the output rod 22a or the braking force can be detected by drivers.

Subsequently, when the depression on the brake pedal 52 is released, the input rod 11 is first retracted under the reaction force acting on the valve piston 12 and the resilient force of the return spring 24, then the second valve seat $10_2$ is seated on the valve portion 13c which is simultaneously placed into abutment against the front face of the valve retainer sleeve 14 and the axial compressive deformation of the valve body 13c is produced under the retractive force of the input rod 11. As the result, a clearance larger than the initial clearance g is produced between the first valve seat $10_1$ and the valve portion 13c to equalize the pressures of both the working chambers A and B without delay.

When the above pressure difference disappears, the booster piston 2 is retracted under the resilient force of the return spring 7 and is stopped as projections 3b of the piston diaphragm 3 are abutted against the inside surface of the rear wall of the booster shell 1. When the input rod 11 is abutted against the end wall 1d, the valve portion 13c is released from the retractive force of the input rod 11 and restored to the original shape, so that the above clearance can be again narrowed to be the original one g.

If the brake pedal 52 is depressed to advance the booster piston 2 in the case where the vacuum pressure is not yet accumulated in the first working chamber A, the air remaining in the first working chamber A which has not been discharged into the vacuum supply source because of the resistance inside the pipe line or the like is compressed. When air pressure of the second working chamber B is exceeded by that of the first working chamber A, a portion of the remaining air inside the first working chamber A enters a space between the rear surface of the booster piston 2 and the piston diaphragm 3 to push the annular bead 3c around the through hole 32 so as to separate the latter from the rear end 46b of the bellows 46, as a consequence of which both the working chambers A and B are placed in communication with each other through thus formed clearance between the annular bead 3c and the rear end 46b of the bellows 46 and through the through hole 32 of the piston diaphragm 3. Therefore, such troubles as the rearward swelling transformation of the piston diaphragm 3 caused by an excessive rearward pushing force can be prevented since the air pressures in both the working chambers A and B become immediately balanced with each other through the clearance and the through hole 32. When the above pressure difference is eliminated, the annular bead 3c is again placed into close contact with the rear end 46c of the bellows 46.

As has been described, according to the present invention, tie rod means connecting the front and rear walls of the booster shell is connected to the spring retainer plate which is adapted to support the fixed end of the return spring, so that the resilient force of the return spring can be chiefly loaded on the tie rod means through the spring retainer plate, thus preventing the resilient force from being loaded on the booster shell. Further, since the spring retainer plate connected to the tie rod means is abutted against the inside surface of the front wall of the booster shell, the front wall of the booster shell can be prevented from deformation due to the sucking action of vacuum pressure in the booster shell and any possible inconveniences accompanied by light-weighted arrangement of the booster shell can be eliminated. In this regard, the spring retainer plate can be made of light material such as aluminum alloy or synthetic resin or the like, which produces only a little increase in weight of the device as a whole.

In addition, the tie rod means has at least two tie rods, each of which is connected to the spring retainer plate in a rotation-proof manner, so that both the tie rods and the spring retainer plate cooperate with one another to ensure a firm fixation of respective tie rods in a non-rotatable condition. Therefore, when the tie rods are connected with the master cylinder by use of the mounting bolts and nuts disposed at both the end portions of the tie rods, such connecting work can be carried out easily and securely without causing any rotation of the tie rods. In consequence, any specific anti-rotating means need not be arranged between the booster shell and tie rods, which are formed thin and have relatively low mechanical strength, to advantageously contribute to maintenance of the durability of the booster shell and of the sealability of the tie rod through hole.

What is claimed is:

1. In a vacuum booster device comprising a booster shell, a booster piston axially slidably accommodated in said booster shell, first and second working chambers defined in said booster shell separately from each other by said booster piston, said first working chamber being held in communication with a vacuum source, said second working chamber being selectively placed in communication with said first working chamber or the atmosphere through a control valve means, an input rod arranged in said booster piston for forward and rearward movement and connected to said control valve means so as to produce a pressure difference between both of said first and second working chambers effective to cause said booster piston to follow the forward movement of said input rod, tie rod means extending through said booster piston for connection of front and rear walls of said booster shell, sealing means arranged between said tie rod means and said booter piston to allow the operation of said piston, and a return spring compressed in said first working chamber for biasing said booster piston in its retracting direction, the improvement which comprises a spring retainer plate supporting the fixed end of said return spring, said spring retainer plate being abutted against the front wall of said booster shell and having a pair of bosses integrally projected at its both ends, each of said bosses being provided at its inner end with an intercepted round concave hole; said tie rod means including at least two tie rods having integral mounting bolts formed at ends thereof so as to project outwardly of said booster shell, said tie rods each having an intercepted round flange disposed thereon, said spring retainer plate being fixed to said front wall by the two tie rods penetrating through said bosses thereby preventing relative rotation of the spring retainer plate with respect to the front wall of the booster shell, the intercepted round flange of each of the tie rods being fitted in the intercepted round concave hole formed on each of the bosses thereby holding each tie rod in a rotation-proof manner.

* * * * *